(12) United States Patent
Bodin

(10) Patent No.: US 7,163,217 B2
(45) Date of Patent: Jan. 16, 2007

(54) DEVICE FOR STEERABLE SUSPENSION OF A VEHICLE WHEEL

(75) Inventor: Jan-Olof Bodin, Alingsås (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/905,166

(22) Filed: Dec. 20, 2004

(65) Prior Publication Data

US 2005/0151338 A1 Jul. 14, 2005

Related U.S. Application Data

(63) Continuation of application No. PCT/SE03/001019, filed on Jun. 17, 2003, now abandoned.

(30) Foreign Application Priority Data

Jun. 19, 2002 (SE) .................................... 0201866

(51) Int. Cl.
*B62D 7/16* (2006.01)

(52) U.S. Cl. ................. 280/93.511; 280/89.1; 280/93.512

(58) Field of Classification Search .......... 280/93.512, 280/89.1, 124.125; 301/132
See application file for complete search history.

(56) References Cited

U.S. PATENT DOCUMENTS

| 6,029,986 | A | * | 2/2000 | Bodin et al. | ........... 280/93.512 |
| 6,217,046 | B1 | * | 4/2001 | Bodin et al. | ........... 280/93.512 |
| 6,499,752 | B1 | * | 12/2002 | Davis | ..................... 280/93.512 |
| 6,607,203 | B1 | * | 8/2003 | Bodin | ..................... 280/93.512 |
| 6,623,019 | B1 | * | 9/2003 | Davis | ..................... 280/93.512 |
| 6,719,312 | B1 | * | 4/2004 | Thompson et al. | ..... 280/93.511 |
| 6,733,019 | B1 | * | 5/2004 | Diener et al. | ............. 280/93.51 |
| 6,827,359 | B1 | * | 12/2004 | Barila | ..................... 280/93.512 |
| 2003/0075892 | A1 | | 4/2003 | Tisch et al. | |
| 2003/0137120 | A1 | * | 7/2003 | Thompson et al. | .... 280/93.511 |

FOREIGN PATENT DOCUMENTS

| FR | 5728 E | 8/1906 |
| FR | 498423 A | 1/1920 |
| SE | 510895 C2 | 7/1999 |
| WO | WO 9845159 A1 | 10/1998 |
| WO | WO 0145996 A1 | 6/2001 |

* cited by examiner

*Primary Examiner*—Paul N. Dickson
*Assistant Examiner*—Toan C. To
(74) *Attorney, Agent, or Firm*—Novak Druce & Quigg, LLP

(57) ABSTRACT

Arrangement for providing a steerable suspension to a vehicle wheel that includes a first bearing (1) and a second bearing (2) arranged at a supporting unit (3) in order to form a geometrical pivot axis (4) around which the vehicle wheel is journalled in bearings steerable in relation to the supporting unit. The supporting unit exhibits at least one supporting surface (8) and the first bearing exhibits an inner ring with an external. Radially directed surface (22) is arranged for abutting and resting against the supporting surface (8) in order to take up forces directed radially in relation to the geometrical pivot axis (4).

14 Claims, 3 Drawing Sheets

DEVICE FOR STEERABLE SUSPENSION OF A VEHICLE WHEEL

CROSS-REFERENCE TO RELATED APPLICATIONS

The present application is a continuation patent application of International Application No. PCT/SE03/001019 filed 17 Jun. 2003 now abandoned which was published in English pursuant to Article 21(2) of the Patent Cooperation Treaty, and which claims priority to Swedish Application No. 0201866-1 filed 19 Jun. 2002. Said applications are expressly incorporated herein by reference in their entireties.

FIELD OF THE INVENTION

The present invention relates to an arrangement for steerable suspension of a vehicle wheel. The arrangement includes first and second bearings that are arranged in a supporting unit to form a geometrical pivot axis around which the vehicle wheel is journalled in bearings steerably in relation to the supporting unit. The supporting unit exhibits at least one supporting surface. The invention is applicable on different types of vehicle wheels, and particularly non-driven vehicle wheels that are used for steering the incorporating vehicle, such as a truck.

BACKGROUND OF THE INVENTION

The most commonly occurring suspension arrangements in trucks for steerable wheels is of the type that utilizes a knuckle pin in order to form a steering knuckle, and by means of which the vehicle wheel can be pivoted in relation to an axle beam of the vehicle. The knuckle pin, which also often termed a "king pin", is arranged substantially vertically and attached to the axle beam by means of a conical coupling.

The wheel is suspended from the axle beam via bearings arranged at the two free ends of the knuckle pin. At the upper end of the knuckle pin, a conical roller bearing can be used in order to take up both radial and axial forces. The lower bearing is often a slide bearing for taking up radial forces only.

Although previously known suspension arrangements (see SE 510 895 and patent application SE 9904731-8) provide satisfactory function in most instances, they have characteristics which result in comparatively high production and assembly costs. The knuckle pins in these examples are relatively expensive to manufacture, and also require careful machining of a conical bore into the axle beam. The bore in the axle beam and the similarly conical knuckle-in form a conical friction coupling. This means that the design of the knuckle pin and the axle beam also determines the relative positioning of these two components in the longitudinal direction, relative to the knuckle pin, when mounting the knuckle pin in the axle beam. Furthermore, special equipment is required for mounting the knuckle pin in the axle beam, and even if such equipment is used, it is difficult to predict the final position of the knuckle pin in relation to the axle beam with high accuracy and to ensure that the knuckle pin is arranged in the intended position in relation to the axle beam during the assembly. This in turn makes it complicated to mount the bearings on the knuckle pin, since an adjustment of the axial play will be necessary as a result of the uncertainty concerning the position of the knuckle pin.

SUMMARY OF THE INVENTION

An object of the invention is to provide an arrangement which enables a vehicle wheel to be pivoted, and thereby enables steering of a vehicle equipped with such wheels without the use of a conventional knuckle pin. In the inventive arrangement, at least some of the above-discussed disadvantages of the previous suspension arrangements of the type in question have been substantially reduced.

In an exemplary embodiment, the invention takes the form of an arrangement for steerable suspension of a vehicle wheel. The arrangement includes a first bearing and a second bearing arranged at a supporting unit in order to form a geometrical pivot axis around which a vehicle wheel is journalled in bearings steerably in relation to the supporting unit and wherein the supporting unit exhibits at least one supporting surface. A first bearing exhibits an inner ring that is arranged for abutting and resting against the (at least one) supporting surface of the supporting unit in order to take up forces acting radially in relation to the geometrical pivot axis. This feature implies a suspension arrangement which exhibits characteristics of transmitting radial forces to the supporting unit which can be provided without the use of a knuckle pin, at least where the arrangement of the first bearing is concerned.

Accordingly, it is possible to design a suspension arrangement with, for example, a shorter knuckle pin this is only intended for arranging the second bearing, or to omit the knuckle pin entirely if it is acceptable that only one of the bearings takes up radial forces.

In a preferred embodiment of the inventive arrangement, the second bearing exhibits an inner ring that is arranged for abutting and resting against the (at least) one supporting surface, or against a second supporting surface of the supporting unit in order to take up forces acting radially in relation to the pivot axis. In this way, the use of a conventional knuckle pin can be dispensed with entirely, while at the same time the arrangement is capable of taking up radial forces at both bearings.

In another preferred embodiment of the arrangement according to the invention, the supporting unit is provided with a first land surface for fixing the inner ring of the first bearing in a direction parallel to the geometrical pivot axis and towards the supporting unit, and a second land surface for fixing the inner ring of the second bearing in a direction parallel to the geometrical pivot axis and towards the supporting unit. By means of these shoulders, the two bearings can be mounted at the supporting unit in a simple way and with high precision, when their positions in relation to the supporting unit are concerned, in order to bring about a geometrical pivot axis around which a wheel can be pivoted.

In a further preferred embodiment of the arrangement according to the invention, a member is arranged for simultaneously pressing the inner ring of the first bearing against the first land surface and the inner ring of the second bearing against the second land surface. This can, for example, be accomplished by means of a threaded rod and a corresponding internal thread of one of the inner rings of the two bearings, and by further means of which the rod and the two bearings are pressed in a direction towards each other and against the respective shoulders of the supporting unit when the threaded connection is tightened. This results in an especially simple and reliable mounting of the two bearings which can be performed simply by means of tightening the threaded coupling in question with a predetermined torque in order to ensure that the bearings are positioned in the intended positions and that they are firmly anchored to the supporting unit.

Other advantageous features and functions of different embodiments of the arrangement for suspension of a vehicle wheel according to the invention appear from the following description and claims.

DETAILED DESCRIPTION OF PREFERRED EMBODIMENTS OF THE INVENTION

Figure 1:
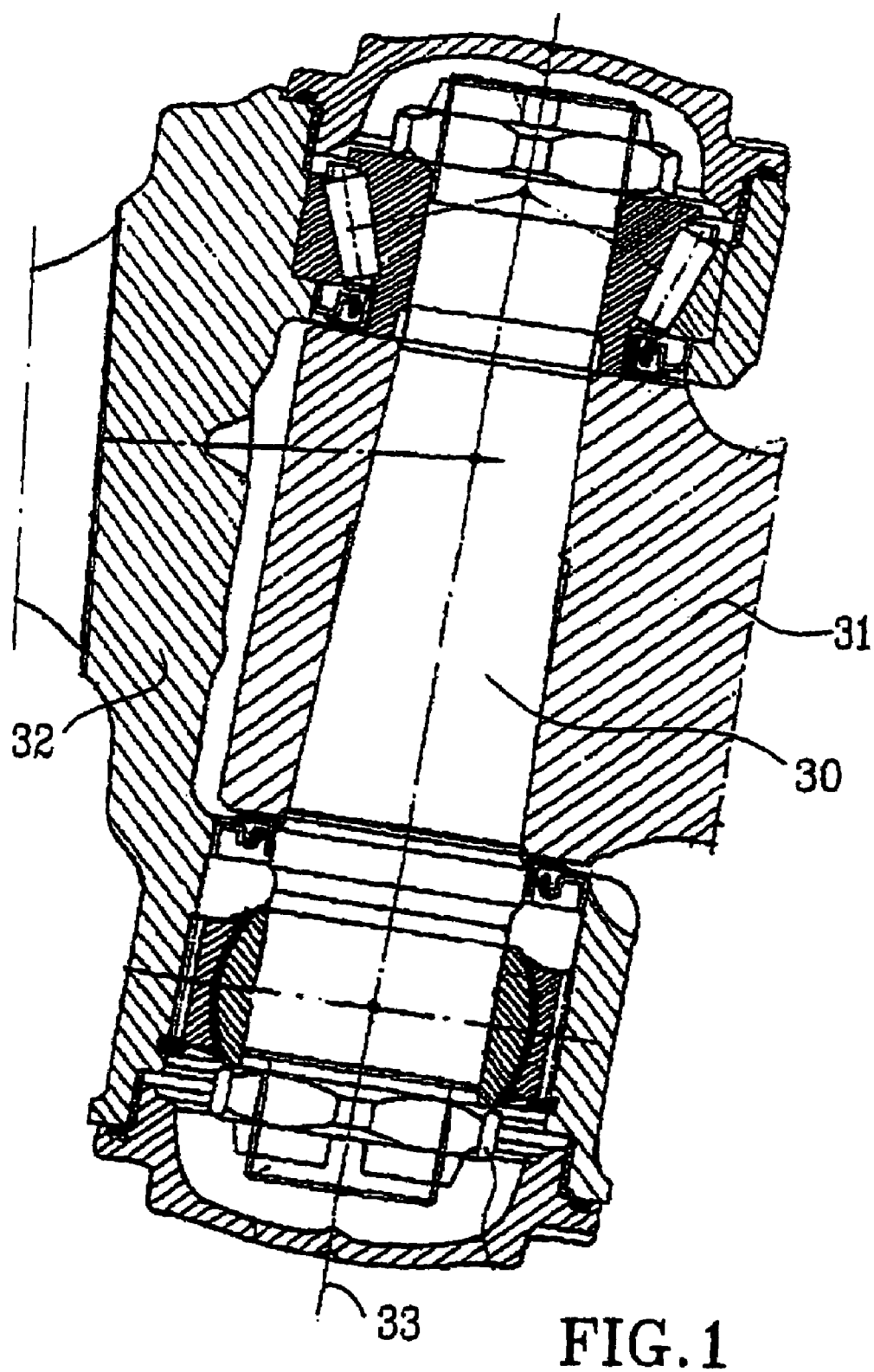
FIG. 1 is a cross-sectional view illustrating a steering axle arrangement for a vehicle wheel of previously known design.

FIG. 1 illustrates a steering axle arrangement of known design. For a steerable suspension of a vehicle wheel (not shown), the arrangement exhibits a knuckle pin 30 which is provided with bearings at both ends. The knuckle pin is firmly attached to an axle beam 31 by means of a conical friction coupling. An arm 32, which is intended to be equipped with a vehicle wheel, is suspended from the axle beam via the two bearings and can be pivoted around a substantially vertically arranged pivot axis 33 in relation to the axle beam. The upper bearing is a conical roller bearing for taking up axial and radial forces, and the lower bearing is a slide bearing for taking up only radial forces.

Figure 2:
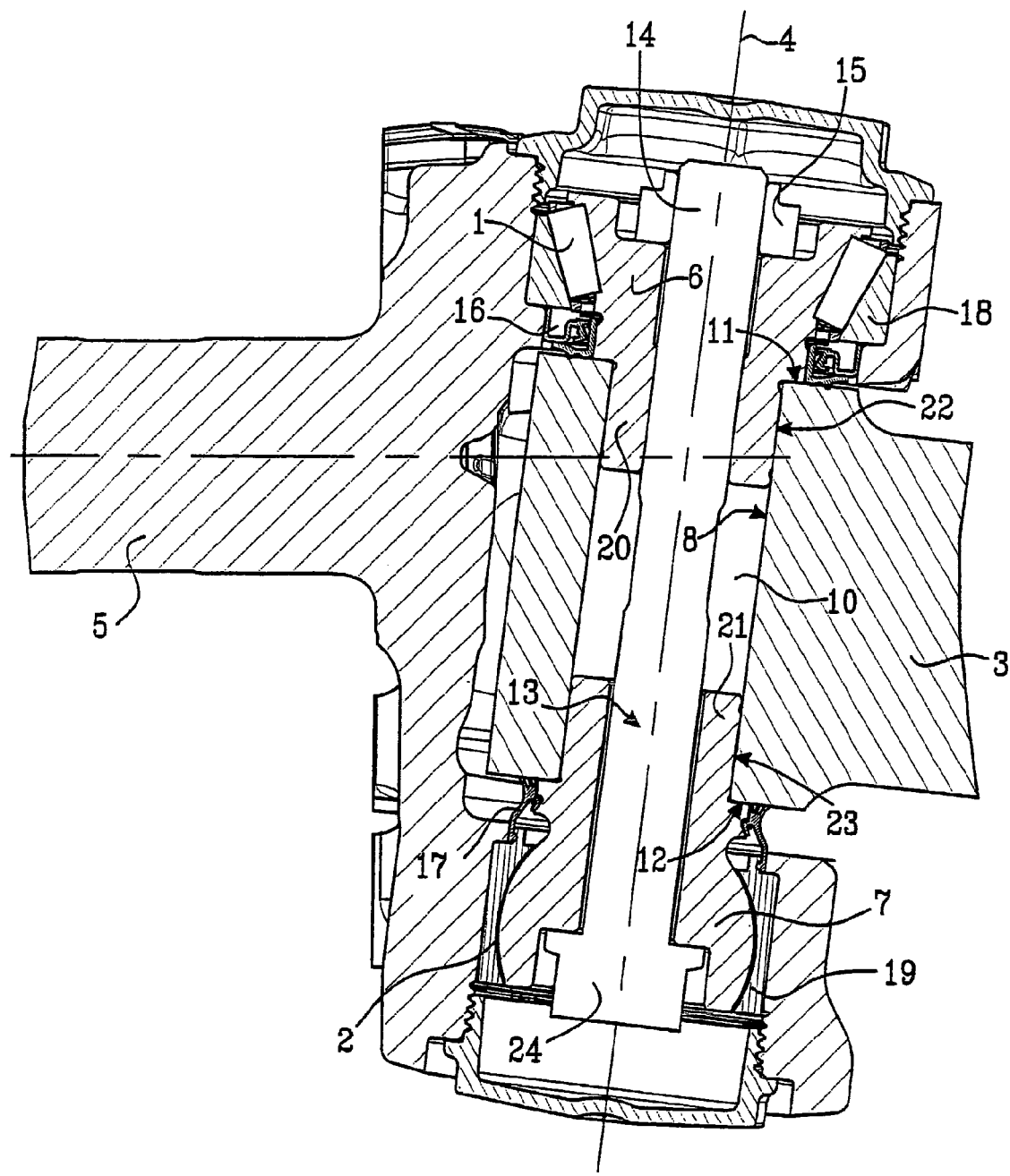
FIG. 2 is a cross-sectional view illustrating an arrangement for a steerable suspension of a vehicle wheel designed in accordance with the teachings of the present invention.

FIG. 2 illustrates an arrangement for steerable suspension of a vehicle wheel designed in accordance with the invention. The arrangement comprises (includes, but is not necessarily limited to) a first bearing 1 and a second bearing 2 arranged in a supporting unit 3 in order to form a geometrical pivot axis 4 around which an arm 5 (which is provided with a vehicle wheel that is not shown) is journalled in bearings to be steerable in relation to the supporting unit. Suitably, the first bearing 1 is a conical roller bearing for taking up radial and axial forces. The second bearing 2 can be a slide bearing for taking up radial forces, or for taking up radial and axial forces. In the illustrated embodiment, the first bearing 1 is arranged above the second bearing 2. Although the conical roller bearing with certain advantages is arranged as the upper bearing and the slide bearing as the lower bearing in the illustrated suspension arrangement, it is also possible to arrange the second bearing, such as a slide bearing, as the upper bearing, and the first bearing, such as a conical roller bearing, as the lower bearing.

Accordingly, the use of a conventional knuckle pin, where radial forces are taken up via the knuckle pin by means of the inner rings of the bearings arranged around the knuckle pin, and which in its turn is arranged in the axle beam, has been left out in the solution of the presently described invention. Instead, the two bearings are each provided with an inner ring 6,7 of their own which is arranged for abutting and resting, directly or via inserts, against a supporting surface 8 of the supporting unit 3, which for example may be the axle beam 3, which enables the take up of forces acting radially in relation to the geometrical pivot axis 4. In this way, the use of a so-called knuckle pin or the like is eliminated and, accordingly, the problems associated therewith.

The above-mentioned (at least one) supporting surface 8 suitably forms a cylindrical cavity 10 in the supporting unit 3, preferably having a circular cross-section. The cavity is located so that its longitudinal axis is parallel to the geometrical pivot axis 4.

In the embodiment illustrated in FIG. 2, the longitudinal axis of the cavity substantially coincides with the geometrical pivot axis 4. Furthermore, each of the two bearings 1,2 is arranged at its own end of the cavity 10 extending through the supporting unit 3 in order to rest against the supporting surface 8 at different positions and take up forces act radially in relation to the geometrical pivot axis 4.

For this purpose, the inner ring of each respective bearing exhibits a neck portion 20, 21 arranged in the cavity 10 and provided with an external, radially directed surface 22, 23 for abutting against the supporting surface 8. Suitably, the cavity 10 and the inner ring of each respective bearing are designed with a certain gripping fit in order to fix the bearings in the supporting unit 3. In certain cases, for example when a special member is used in order to maintain the bearings in their positions in an axial direction, it can be possible to design the bearings and the cavity in such a way that a small play in fit is obtained between the respective inner ring and the supporting surface of the cavity when mounting the bearings in the supporting unit. However, it is entirely feasible to mount the bearings in the supporting unit by means of threaded couplings, splines, or the like.

It should also be emphasized that, instead of providing the necessary support for the bearings by means of a through-bore, it is of course possible to provide this support by means of designing the supporting unit with two supporting surfaces by means of recessing two cavities, which do not extend through the supporting unit, and which preferably are arranged coaxially on a side of their own in the supporting unit.

The supporting unit 3 is provided with a first land surface 11 for fixing the inner ring 6 of the first bearing 1 in a direction along the geometrical pivot axis 4 towards the supporting unit 3, and the supporting unit further is provided with a second land surface 12 for fixing the inner ring 7 of the second bearing 2 in an opposite direction along the geometrical pivot axis 4 towards the supporting unit. By means of these land surfaces 11, 12, a reliable positioning of the bearings in relation to each other and in relation to the supporting unit 3 is obtained. As a result of this, an adjustment of the axial play will not be necessary when mounting the bearings, and a possible reloading of the bearings can be effected by means of appropriate selections of the machining allowances for the supporting unit 3, the arm 5 and the bearing elements.

Figure 3:
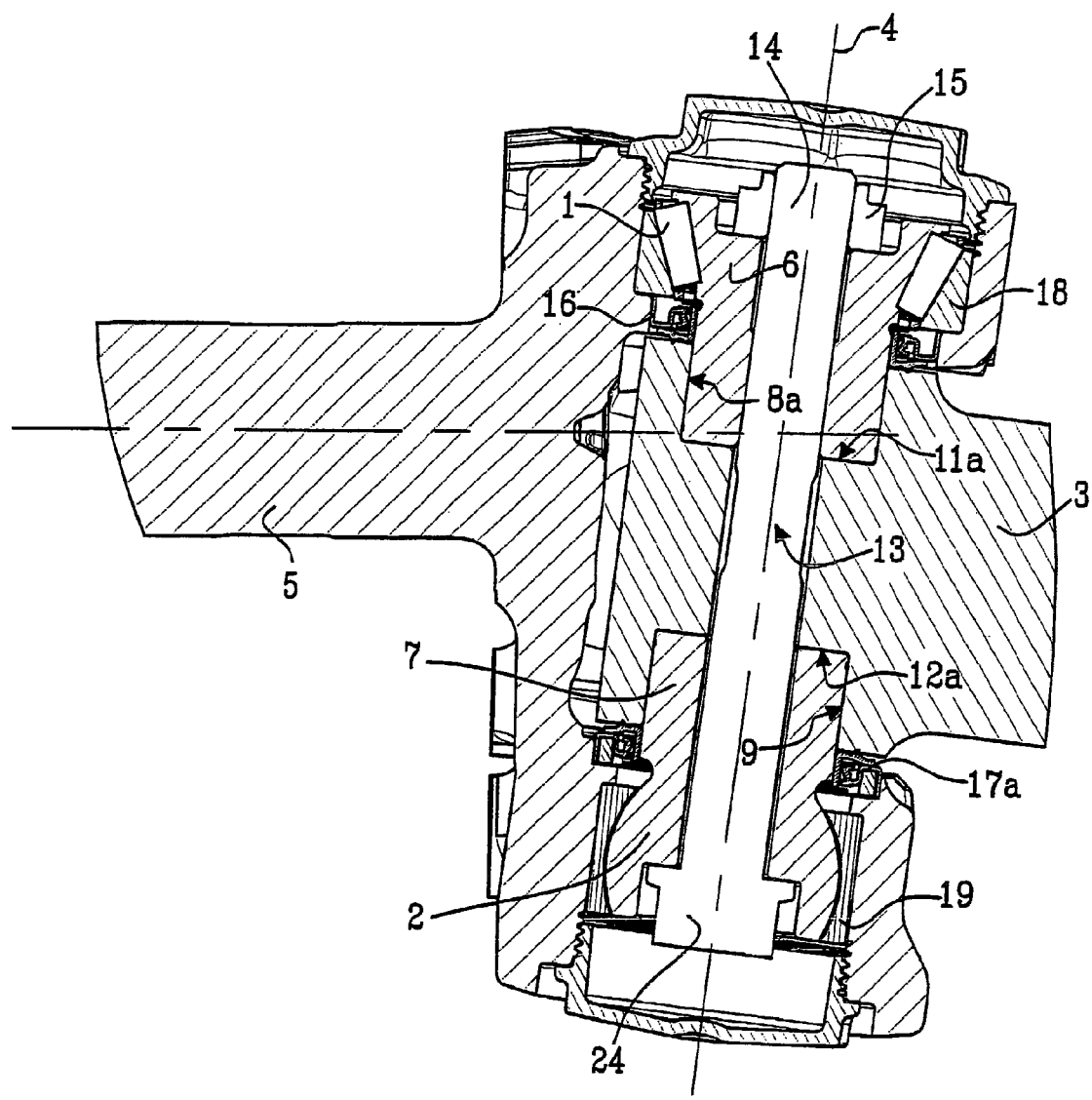
FIG. 3 is a variant of the arrangement of FIG. 2.

FIG. 3 shows an embodiment of the arrangement according to the invention which exhibits two supporting surfaces 8a, 9 for the two inner rings 6, 7 of the bearings 1, 2. Cavities, or so-called bores, in the supporting unit 3 are also utilized for providing the land surfaces 11a, 12a for the inner rings 6, 7 of the two bearings 1,2 in order to position the bearings against the supporting unit 3 in a direction which is parallel to the geometrical pivot axis 4. For the rest, reference is made to the embodiment described in connection with FIG. 2, and throughout the description of the invention similar reference numerals refer to similar or corresponding components.

In the two illustrated examples, the arrangements further include a member 13 arranged for pressing the inner ring 6 of the first bearing 1 against the first land surface 11, 11a and the inner ring 7 of the second bearing 2 against the second land surface 12,12a. The pressing member 13 includes a rod 14, such as a bolt or the like, extending from the first bearing through the supporting unit to the second bearing and substantially in parallel with the pivot axis. This rod is provided with a thread in order to bring about the desired press force by means of a threaded coupling. In this manner, it is possible to simultaneously press the inner ring of the first bearing 1 against the first land surface and the inner ring of the second bearing 2 against the second land surface. Preferably, the inner ring 6 of one of the bearings 1 is provided with an internal thread corresponding to the thread of the rod, whereas the inner ring of the second bearing 2 exhibits a cavity through which the rod runs freely. By means of tightening the threaded coupling between the rod 14 and the threaded bearing 1 with a suitable predetermined torque, the two bearings 1, 2 can be pressed against each respective land surface of the supporting unit 3 so that the bearings are fixed to the supporting unit in the intended positions. At one end, the rod 14 exhibits a head 24 for abutting against the inner ring 7 of one of the bearings 2 and at the other end a tightening nut 15 is arranged in order to ensure that the rod will not be unscrewed from the second bearing 1. In an alternative solution, both bearings can exhibit cavities without any threads in which cavities the rod can run freely, wherein the nut 15 or a corresponding component is utilized in order to obtain the required tightening so that the bearings are kept in their place and, in such a case, a suitable locking member is used in order to secure the nut.

A major advantage with the solution that utilizes such a rod 14 is that it can be designed so that a large elongation in proportion to a conventional knuckle pin is obtained when tightening the threaded coupling. As a result of an unfavourable geometry and yielding in the construction, it may be problematic when using a conventional knuckle pin (as in FIG. 1) to obtain a sufficient tightening torque when mounting the upper bearing since the conventional design of the knuckle pin causes it to exhibit a relatively small elongation at a corresponding force.

In order to obtain an arrangement which, from a lubricating point of view, is substantially maintenance-free, each respective bearing 1, 2 is provided with a seal 16, 17, 17a arranged for sealing between the supporting unit 3 and the portion of the arm 5 in which the outer rings 18,19 of the bearings 1,2 are arranged so that the required lubricant can be applied and contained without the occurrence of leakage to the environment or negative influence on the bearings or the lubricant from the environment.

Within the scope of the presently disclosed inventive concepts, there are of course other ways to design an arrangement in keeping therewith, but which are different from the examples specifically described herein. Moreover, it is emphasized that the invention is only restricted to the scope of protection defined by the following claims. For instance, the lower bearing can include two separate bearing units, for example a first bearing unit in the form of a slide bearing for taking up the radial forces and a second bearing unit in the form of slide bearing for taking up axial forces.

What is claimed is:

1. An arrangement for providing a steerable suspension of a vehicle wheel, said arrangement comprising:
    a first bearing (1) and a second bearing each having an inner ring and being (2) arranged at a supporting unit (3) in order to form a geometrical pivot axis (4) around which a vehicle wheel is journallable in bearings and by which the vehicle wheel is made steerable relative to said supporting unit (3), and said supporting unit (3) comprises at least one supporting surface (8); and
    said inner ring of said first bearing (1) has an external, radially directed surface (22) that extends along the geometrical pivot axis into said supporting unit (3) arranged for abutting and resting engagement against said at least one supporting surface (8) to take up forces acting radially in relation to said geometrical pivot axis (4).

2. The arrangement as recited in claim 1, wherein said inner ring of said second bearing extends along the geometrical pivot axis into said supporting unit (3) arranged for abutting and resting engagement against at least one of: (i) said at least one supporting surface (8) and (ii) a second supporting surface (9) of said supporting unit (3), and thereby taking up forces acting radially in relation to said geometrical pivot axis (4).

3. The arrangement as recited in claim 1, wherein said supporting unit (3) comprises a first land surface (11) for fixing said inner ring (6) of said first bearing (1) in a direction parallel to said geometrical pivot axis (4) and towards said supporting unit (3).

4. The arrangement as recited in claim 1, wherein said supporting unit (3) comprises a second land surface (12) for fixing said inner ring (7) of said second bearing (2) in a direction parallel to said geometrical pivot axis (4) and towards said supporting unit (3).

5. The arrangement as recited in claim 3, further comprising:
    a member (13) arranged for pressing said inner ring (6) of said first bearing (1) against said first land surface (11).

6. The arrangement as recited in claim 3, further comprising:
    a member (13) arranged for simultaneously pressing said inner ring (6) of said first bearing (1) against said first land surface (11) and said inner ring (7) of said second bearing (2) against said second land surface (12).

7. The arrangement as recited in claim 6, wherein said pressing member (13) includes a rod (14) extending from said first bearing (1) through said supporting unit (3) to said second bearing (2) in a substantially parallel orientation relative to said geometrical pivot axis (4) for transmitting press force to said inner ring (6) of said first bearing and to said inner ring (7) of said second bearing.

8. The arrangement as recited in claim 5, wherein said pressing member (13) further comprises a threaded coupling for bringing about a press force.

9. The arrangement as recited in claim 1, wherein said first bearing (1) is a conical roller bearing.

10. The arrangement as recited in claim 9, wherein said first bearing (1) is arranged above said second bearing (2).

11. The arrangement as recited in claim 1, wherein said second bearing (2) is a slide bearing.

12. The arrangement as recited in claim 1, wherein said second bearing is arranged for only taking up forces acting radially relative to said geometrical pivot axis (4).

13. The arrangement as recited in claim 1, wherein said second bearing (2) is arranged for taking up forces acting both axially and radially relative to said geometrical pivot axis (4).

14. The arrangement as recited in claim 1, wherein said second bearing (2) further comprises two separate bearing units, a first bearing unit arranged for taking up radial forces and a second bearing unit arranged for taking up axial forces.

* * * * *